(12) United States Patent
Kennedy, III

(10) Patent No.: US 6,461,461 B2
(45) Date of Patent: Oct. 8, 2002

(54) METHOD OF MANUFACTURING MULTI-LAYER GAME BALL

(75) Inventor: Thomas J. Kennedy, III, Wilbraham, MA (US)

(73) Assignee: Spalding Sports Worldwide, Inc., Chicopee, MA (US)

(*) Notice: Subject to any disclaimer, the term of this patent is extended or adjusted under 35 U.S.C. 154(b) by 0 days.

(21) Appl. No.: 09/894,610

(22) Filed: Jun. 28, 2001

(65) Prior Publication Data

US 2001/0038158 A1 Nov. 8, 2001

Related U.S. Application Data

(62) Division of application No. 08/831,584, filed on Apr. 9, 1997, now Pat. No. 6,261,400.

(51) Int. Cl.[7] .......................... B29C 49/04; A63B 39/06
(52) U.S. Cl. ................. 156/147; 156/145; 156/156; 156/245; 156/287; 156/79; 264/511; 264/515; 264/516; 264/46.6
(58) Field of Search ................. 264/516, 515, 264/511, 46.6; 156/145, 147, 196, 245, 287, 156, 79

(56) References Cited

U.S. PATENT DOCUMENTS

| | | | | |
|---|---|---|---|---|
| 2,483,234 A | * | 9/1949 | Roberts | 156/147 |
| 4,653,752 A | * | 3/1987 | Miller | 473/601 |
| 4,668,567 A | * | 5/1987 | Williams | 428/319.9 |
| 5,004,578 A | * | 4/1991 | Eiselen | 264/514 |
| 5,186,875 A | * | 2/1993 | Fukuhara | 264/37 |
| 5,427,372 A | * | 6/1995 | Ratner et al. | 156/147 |
| 5,480,155 A | * | 1/1996 | Molitor et al. | 473/354 |
| 5,779,968 A | * | 7/1998 | Richwine et al. | 264/515 |

* cited by examiner

Primary Examiner—Suzanne E. McDowell

(57) ABSTRACT

A process for producing multi-layer game ball products includes the steps of extruding an inner layer precursor as a parison in a partial melt state, forming an outer layer, introducing the inner and outer layers into a mold and expanding the parison within the mold to form the multi-layer game ball product. The outer layer may take the form of pre-cut panels vacuum supported in the mold and an intermediate layer may be provided for dimensional stability in the product. Subsequent to expanding the parison a filler such as foam may be injected into the center space for forming a core.

18 Claims, 3 Drawing Sheets

METHOD OF MANUFACTURING MULTI-LAYER GAME BALL

CROSS-REFERENCE TO RELATED APPLICATIONS

This application is a divisional of application Ser. No. 08/831,584, filed Apr. 9, 1997 now U.S. Pat. No. 6,261,400.

BACKGROUND OF THE INVENTION

This invention relates to the field of game balls. More specifically, this invention relates to a multi-layered game ball product and a process for the manufacture thereof.

Efficient manufacturing processes for game ball products having a single layer are well known. The game ball product can be a finished game ball or form the core of a finished game ball. Game ball products produced of a single layer of a material can display less than optimal characteristics. The material of the single layer typically must be capable of performing several different functions simultaneously. For example, a single layer basketball must be constructed of a material that can form an air-tight bladder. In addition, the same material must provide abrasion resistance for an adequate product life for the game ball product. Furthermore, the same material must have dimensional stability for the game ball product to resist overexpansion as the ball is inflated and is used during the product lifetime. Single layer materials typically cannot provide optimal characteristics for all the performance requirements.

Given these differing operational requirements and deficiencies of a single layer game ball product, it is well known to produce a game ball product having multiple layers of differing materials. Each layer of the multi-layer game ball product is directed to providing a specific function or characteristic for a given performance requirement. For example, a game ball product may be produced of two layers. The outer layer provides abrasion resistance, and the inner layer, such as a bladder, provides an air-tight seal for the game ball product. Multi-layer game ball products therefore typically have superior performance characteristics relative to single layer game ball products. However, multi-layered game ball products typically require additional manufacturing steps compared to the production of the single layered game ball product. Therefore, multiple layered game ball products typically have a higher relative production cost and a more extended production time.

For example, basketballs are conventionally constructed by cold molding or hand laying panels of rubber, leather or synthetic leather onto a basketball carcass. These multi-layer basketballs typically require additional manufacturing steps in comparison to a single layer game ball product.

Single and multi-layer game ball products are also used as game ball cores. Game ball products employed as game ball cores for baseballs and softballs are known to be manufactured of flexible, semi-rigid and rigid polyurethane foam, rotational molded polyolefins, foamed ionomers, cork, kapok and wound string. These conventional game ball cores typically require multiple manufacturing steps in addition to further manufacturing to apply an outer shell to the core. Each additional manufacturing step typically increases final cost of the finished game ball.

SUMMARY OF THE INVENTION

Briefly stated, the invention is for the process of manufacturing a multi-layered game ball product wherein at least the inner layer is formed by a molding process. More specifically, the invention is for the process of manufacturing a multi-layered game ball product by forming the game ball product within a mold wherein at least the inner layer of the game ball product is formed by the blow molding of a parison.

The process of the invention is for forming a game ball product having an inner and an outer layer. A parison is formed of at least the inner layer. The outer layer is formed. The inner and outer layers are introduced into a mold. The parison is then expanded to form a multi-layer game ball product.

The process of the invention allows for production of multi-layer game ball products by a reduced number of manufacturing steps relative to the number of manufacturing steps required for conventional processes to manufacture multi-layered game ball products. The process of the invention employs blow molding to manufacture a multi-layered game ball product. The inner layer of the game ball is preferably extruded in a partial melt state to form a parison. The parison can also have 1–5 additional co-extruded layers, each layer preferably chosen to optimize a particular performance requirement of the final game ball product. Pressurized gas is then introduced into the parison to expand the parison against the mold to form the game ball product. After the game ball product has sufficiently cooled, the game ball product is removed from the mold.

In one preferred embodiment of the process, a co-extruded three layer parison is blow molded to form a finished game ball. The material of the outer layer is selected for feel and abrasion resistance. The material of the intermediate layer is selected for dimensional stability when the game ball product is inflated and the material of the inner layer is selected for air entrapment. The parison of the three layers is blow molded to form the finished game ball product.

In a further embodiment of the invention, particularly suited for the manufacture of basketballs, an inner layer can be blow molded onto pre-cut panels supported on the inside surface of a mold to produce a multi-layered game ball product. For example, a multi-layered basketball can be produced by vacuum supporting outer layer panels of synthetic leather on the inside of a basketball mold. The inner layer of the basketball is extruded in a partial melt state as a parison into the mold and blow molded onto the outer layer panels. The parison in the partial melt state bonds to the synthetic leather panels to form the finished multi-layer basketball. As an alternative, an adhesive can be applied to the outer layer panels prior to the blow molding to provide bonding between the inner layer and the outer layer panels.

In still another embodiment of the invention, the multi-layered game ball product can be injected with a filler subsequent to blow molding of the parison. For example, a softball can be produced by blow molding a multi-layer parison onto a softball mold to form a game ball shell. The resulting game ball shell is then filled with a foam to complete the finished game ball.

In addition, the filled game ball product manufactured by the process of the invention can be employed as the core for a finished game ball. An additional outer layer can be molded onto the filled game ball product. Alternately, a conventional softball or baseball cover can also be stitched onto the filled game ball product to form the finished game ball.

An object of the invention is to provide a production process for the efficient manufacture of a multi-layered game ball product.

Another object of the invention is to provide a production process to manufacture a multi-layered game ball product with a reduced number of production steps relative to a conventional multi-layer game ball product process of manufacture.

A further object of the invention is to provide a production process having an increased production rate of game ball products.

A still further object of the invention is to provide a game ball production process having reduced costs relative to conventional production processes of multi-layer game ball products.

These and other objects of the invention will be apparent from the following description and figures.

DETAILED DESCRIPTION OF THE PREFERRED EMBODIMENTS

Figure 1:
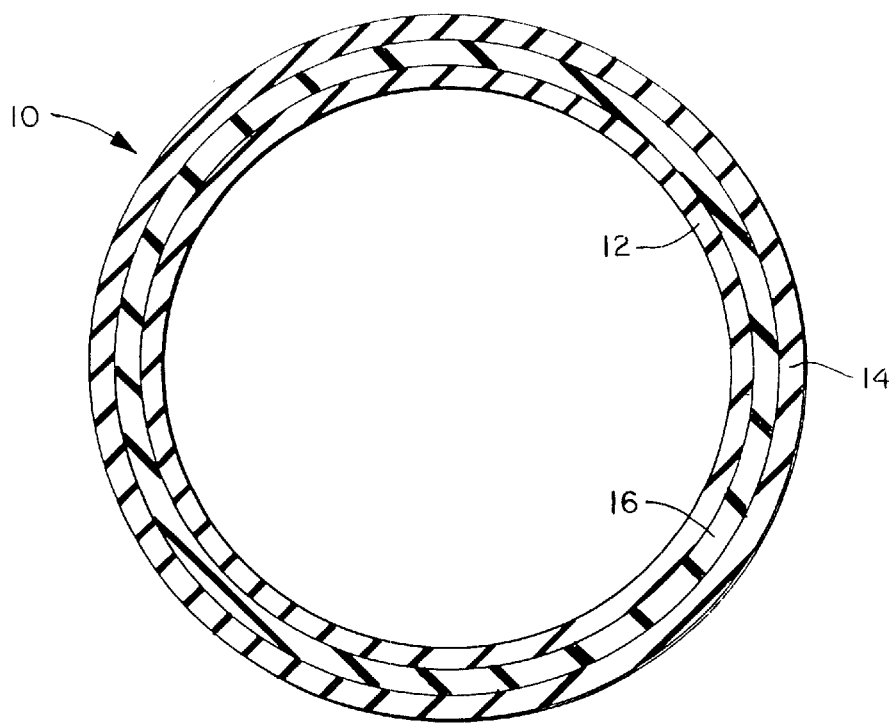
FIG. 1 is a cross-sectional view of a game ball product manufactured by the process of the invention.

With reference to the drawings wherein like reference numerals represent like components throughout the figures, a multi-layer game ball product produced in accordance with the process of the invention is designated by the numeral 10. The game ball product 10 has at least an inner layer 12 and an outer layer 14. (See FIG. 1) Interposed between the inner layer 12 and outer layer 14 can be at least one intermediate layer 16. At least the inner layer 12 is blow molded to form the multi-layer game ball product 10. The game ball product 10 can be a finished game ball or a game ball core requiring additional manufacturing steps to be completed.

Figure 3:
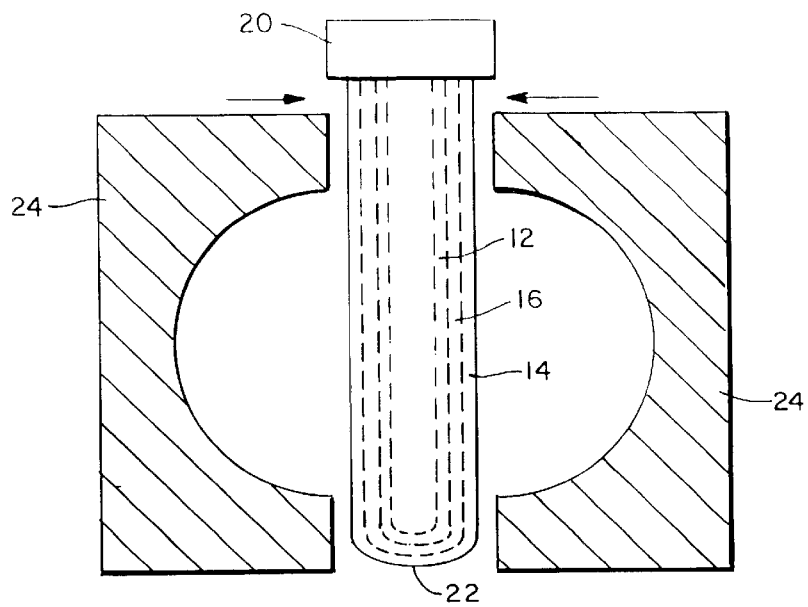
FIG. 3 is a schematic, cross-sectional side view of a blow molding apparatus and parison employed in the process of the invention.

The game ball product 10 is manufactured by a blow molding process. (See FIG. 3) In the blow molding process of the invention, an extruder head 20 forms or extrudes a preform or parison 22 of at least the inner layer 12 in a semi-melt state. The parison is preferably extruded into a mold 24. However, the parison 22 can be extruded or formed outside the mold 24 and then positioned within the mold 24. The outer layer 14 can be co-extruded or co-formed with the inner layer, or the outer layer 14 can be pre-positioned on the interior surface of the mold 24. The halves of the mold 24 are driven together to close the mold 24 around the parison 22. The excess portions of the parison 22 extending above and below the cavity formed by the mold 24 are pinched off by the mold 24 as the mold is closed. Next a pressurized gas is introduced into the parison 22 to expand the parison 22 within the mold 24 and form the multi-layer game ball product 10. The game ball product 10 is then cooled and removed from the mold 24.

In one embodiment in accordance with the invention, the parison 22 is composed of 2–6 co-extruded coaxial layers of material. A co-extruded parison 22 has each layer in a semi-melt state and each layer is generally in surface to surface contact with each adjacent layer. For the manufacture, for example, of a basketball, the parison 22 preferably has two or three layers. The material for the outer layer 14 for either the two or three layer basketball is selected for "feel" and abrasion resistance. The outer layer 14 is preferably a low durometer material such as styrene-butadiene-styrene block copolymer, for example Kraton™ marketed by Shell; a thermoplastic polyurethane; a dynamically vulcanized ethylene; or a propylene diene monomer/polypropylene copolymer, for example ethylene propylene diene monomer (EPDM)/olefin copolymers such as Santroprene™ marketed by Monsanto; or Sarlink™ marketed by DSM.

The material for the inner layer 12 is selected for air entrapment. For a two layer game ball product 10 the inner layer 12 is preferably constructed of a suitable thermoplastic or thermoset material, for example an impact-modified high density polyethylene, a low density polyethylene or a dynamically vulcanized thermoplastic rubber. Typically the material is vulcanized by the resin manufacturer using standard techniques such as the addition of peroxide coupled with high shear rate mixing. A three layer game ball product preferably has an inner layer 12 of a butyl rubber modified material. While the above-identified process is particularly well-suited for the manufacture of basketballs, other multi-layered game ball products can be manufactured by the same process employing the same or similarly identified materials.

The intermediate layer 16, when employed, provides dimensional stability to the three layer game ball product. The intermediate layer 16 is preferably a stiff, dimensional stabilizing material such as an impact-modified high density polyethylene, a high density polyethylene with fibers, or low density polyethylene. Additional intermediate layers can be employed for bonding between the layers 12, 14, 16 when the layers 12, 14, 16 are not compatible. For example, a layer of ethylene/vinyl acetate adhesive can be provided between a layer of olefin and a layer of polyurethane for bonding therebetween.

Figure 2:
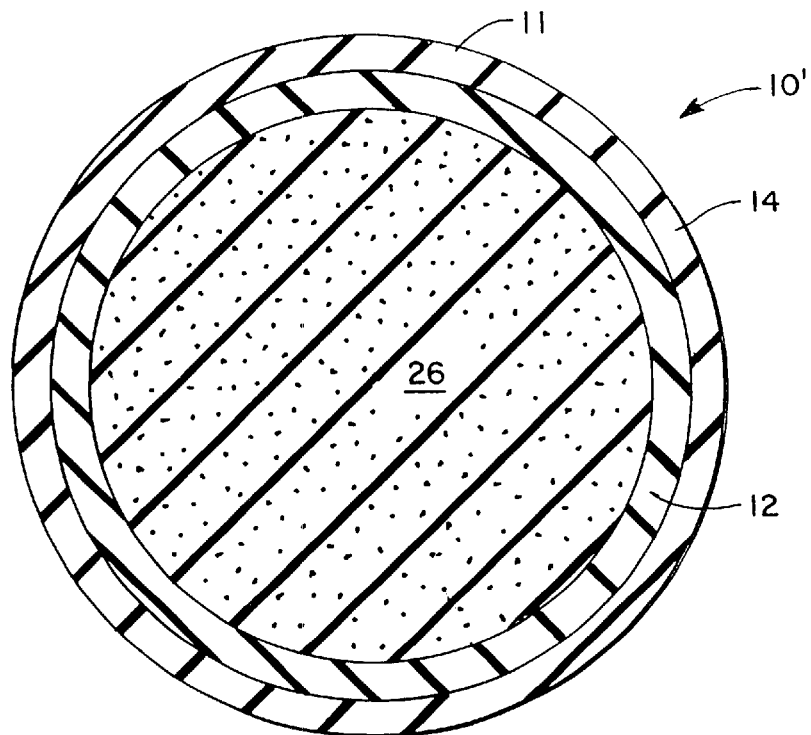
FIG. 2 is a cross-sectional view of an alternate game ball product manufactured by the process of the invention.

An alternate embodiment game ball product 10' manufactured in accordance with the invention has a solid or filled central volume 26. For example, the process of the invention can be used for the manufacture of softballs having a multi-layered blow molded shell and a filled central volume. (See FIG. 2) The filled game ball product 10' can be composed of 1–3 layers, but is preferably constructed of two layers and a filled central volume. The game ball product 10' has a low durometer outer layer 14 of preferably 40–80 Shore A (ASTM D2240). An example includes an EPDM/olefin-type material such as Sarlink™, marketed by DSM, having a durometer of 70–80 Shore A (ASTM D2240). The game ball further has a stiffer harder inner layer 12 of preferably a material having a durometer of 40–70 Shore D (ASTM D2240).

The inner and outer layers 12, 14 are preferably co-formed or co-extruded to form a multi-layer parison 22 and blow molded in preferably an aluminum casting or mold 24 of a soft ball. The inner and outer layers 12, 14 form a shell 11 having a central volume that is injected with a filler 26, preferably a foam, after the blow molding is completed. Examples of fillers 26 include foams such as polyurea, polyurethane and syntactic foam injected into the shell 11. Preferably a liquid polyurethane mixture is introduced through the blow hole in the shell 11 by the use of a high pressure polyurethane machine. The polyurethane reacts and foams in situ displacing the air in the shell 11 and forming the inner portion or filler 26 of the game ball product 10'.

A filled game ball product 10' in accordance with the invention can also be used as a game ball core. Inner and outer layers 12, 14 of the game ball product 10' can be composed of high density polyethylene and low density polyethylene as well as EPDM/olefin materials. In one embodiment, the shell 11 is formed of six layers. Further fillers 26 are be employed in the shell 11 for additional strength. These fillers include polyurethane foams and the other above identified foams. A cover is preferably stitched over the outer layer 14 of the filled game ball product 10' to form a softball or a baseball. Alternately, the cover can be molded over the game ball product 10'.

Figure 4:
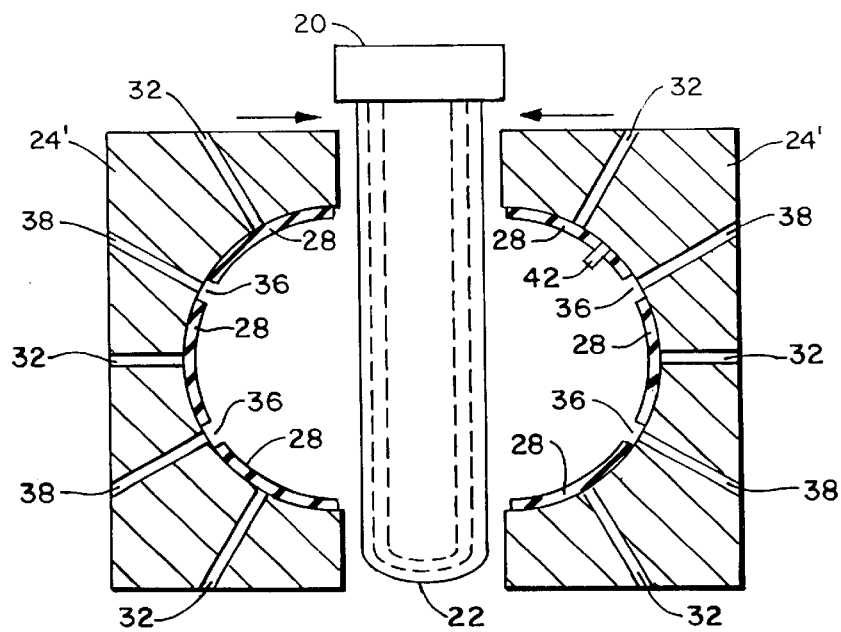
FIG. 4 is a schematic, cross-sectional side view of a blow molding apparatus and parison for production of a panelled game ball product by the process of the invention.
Figure 5:
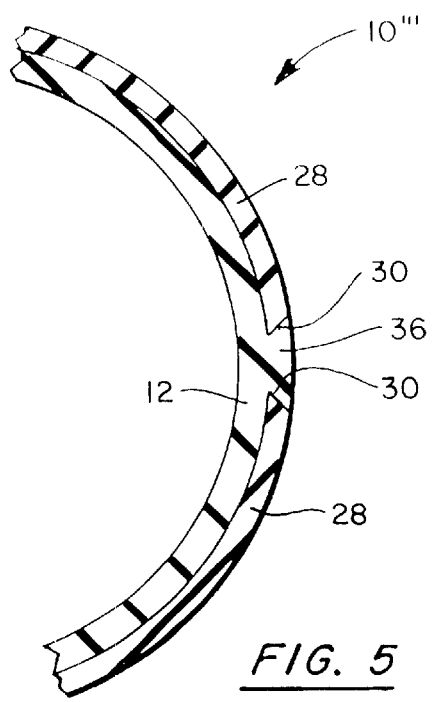
FIG. 5 is a fragmentary, enlarged cross-sectional view of a game ball produced from the apparatus of FIG. 4.
Figure 6:
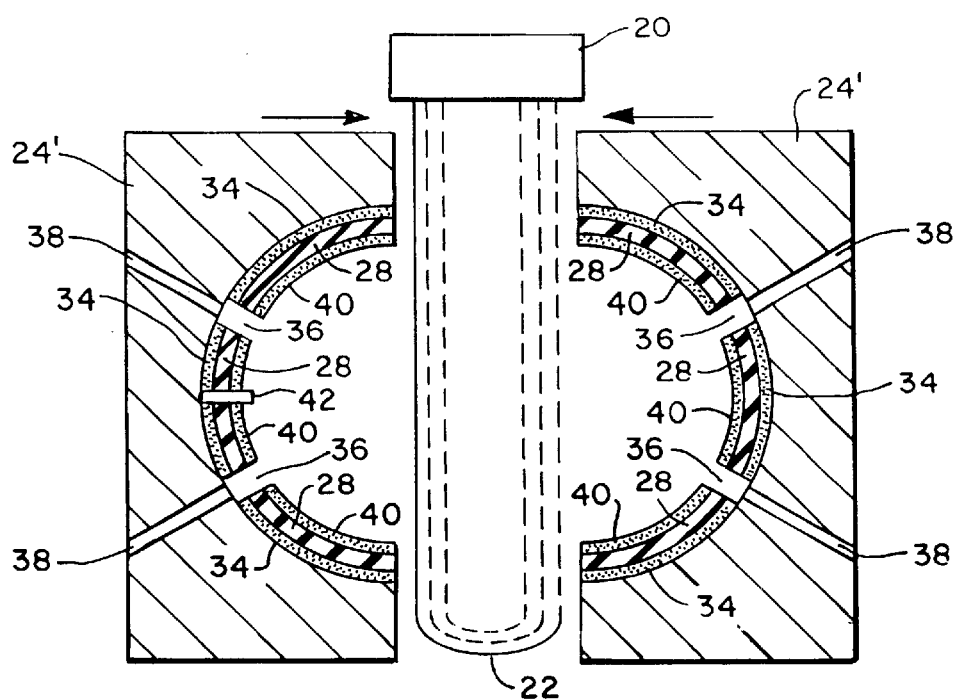
FIG. 6 is a schematic, cross-sectional side view of a blow molding apparatus and parison for production of an alternate embodiment of the panelled game ball product produced by the process of the invention.

In another alternate embodiment of a gameball product manufactured in accordance with the invention, a multi-layered game ball product 10''' can be manufactured having a blow molded inner layer 12 and an outer layer comprising panels 28. (See FIGS. 4 and 5) The process for the manufacture of the panelled multi-layer game ball product 10''' is particularly suited for the production of basketballs. Panels 28 of leather, synthetic leather or rubber are cut from a roll of material in the appropriate shape. The edges of the panels 28 are then preferably cut or "skived" to form bevels 30 for improved adherence or interlocking of the panels 28 to the inner layer 12. The mold may also be cut so as to allow a bevel at the insert/center carcass interface. In this case, the panels would not need to be skived, just die cut. The panels 28 are positioned on the inside surface of a mold 24'. The mold 24' supports the panels 28 by use of vacuum ports 32 holding the panels 28 against the interior of the mold by a vacuum force. (See FIG. 4) Alternately, the mold 24' can be lined with a low peel strength pressure sensitive adhesive 34 to hold the panels 28 to the mold 24'. (See FIG. 6)

The panels 28 are positioned to define channels 36 therebetween. Vents 38 are located in the mold 24' at the channels 36 to allow for air between the parison 22 and the panels 28 to be evacuated when the parison 22 is inflated. The parison 22 of at least the inner layer 12 is introduced to the mold 24' and inflated. The parison 22 preferably adheres to the back of the panels 28 and fills the channels 36 between the panels 28. (See FIG. 5) The inflated parison, still in the partial melt state, can directly adhere to the panels 28 on the interior of the mold as a result of the adhesive qualities of the blown parison 22 bonding to the material of the panels 28. Alternatively, an adhesive 40 can be applied to the back of the panels 28 for bonding engagement to the inner layer 12. (See FIG. 6) Preferably at least one panel 28 is fitted with a valve 42 for the introduction of air into the final game ball product 10'''.

While preferred embodiments in accordance with the present invention have been illustrated and described in detail, it should be readily appreciated that many modifications and changes thereto are within the ability of those of ordinary skill in the art. Therefore, the appended claims are intended to cover any and all of such modifications which fall within the true spirit and scope of the invention.

What is claimed is:

1. A method for forming a multi-layer game ball product, said game ball having an inner and outer layer, the method comprising:
   co-forming a parison of at least said inner layer and said outer layer;
   introducing said parison into a mold; and
   expanding said parison to form said multi-layer game ball product.

2. The method of claim 1 wherein said co-forming comprises co-extruding said inner and outer layers.

3. The method of claim 1 further comprising co-forming an intermediate layer between said inner layer and said outer layer to form said parison.

4. The method of claim 3 wherein said co-forming comprises co-extruding said inner, intermediate and outer layers.

5. The method of claim 3 further comprising forming an additional outer layer comprising a plurality of game ball panels.

6. The method of claim 5 wherein said forming said additional outer layer comprises introducing said plurality of game ball panels into said mold prior to expanding said parison.

7. The method of claim 1 further comprising co-forming a plurality of layers between said inner layer and said outer layer to form said parison.

8. The method of claim 1 further comprising filling said game ball product with a foam.

9. The method of claim 8 further comprising stitching a cover over said outer layer of said game ball.

10. The method of claim 9 wherein said game ball is a softball.

11. The method of claim 1 wherein forming said parison and introducing said parison into said mold are co-extensive.

12. The method of claim 1 further comprising filling said game ball with a liquid.

13. The method of claim 12 wherein said game ball is a softball.

14. The method of claim 1 further comprising forming an additional outer layer comprising a plurality of game ball panels.

15. The method of claim 14 wherein said forming said additional outer layer comprises introducing said plurality of game ball panels into said mold prior to expanding said parison.

16. The method of claim 15 further comprising supporting said panels in said mold by a vacuum.

17. The method of claim 15 further comprising supporting said panels in said mold by an adhesive positioned between said panels and said mold.

18. The method of claim 15 further comprising coating said panels with an adhesive prior to expanding said parison.

* * * * *